April 26, 1927.

S. M. FAIRCHILD 1,626,032

PHOTOGRAPHIC SHUTTER

Filed June 1, 1922

INVENTOR
S. M. Fairchild
BY
Cooper, Kerr & Dunham
ATTORNEYS

April 26, 1927.

S. M. FAIRCHILD

PHOTOGRAPHIC SHUTTER

Filed June 1, 1922

INVENTOR
S. M. Fairchild
BY
Cooper, Kerr & Dunham
ATTORNEYS

April 26, 1927. 1,626,032
S. M. FAIRCHILD
PHOTOGRAPHIC SHUTTER
Filed June 1, 1922    5 Sheets-Sheet 3

INVENTOR
S. M. Fairchild
BY
Cooper, Kerr & Dunham
ATTORNEYS

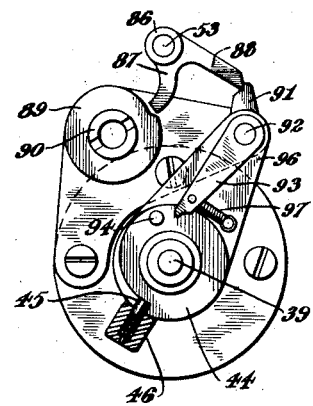

April 26, 1927.
S. M. FAIRCHILD
1,626,032
PHOTOGRAPHIC SHUTTER
Filed June 1, 1922
5 Sheets-Sheet 5
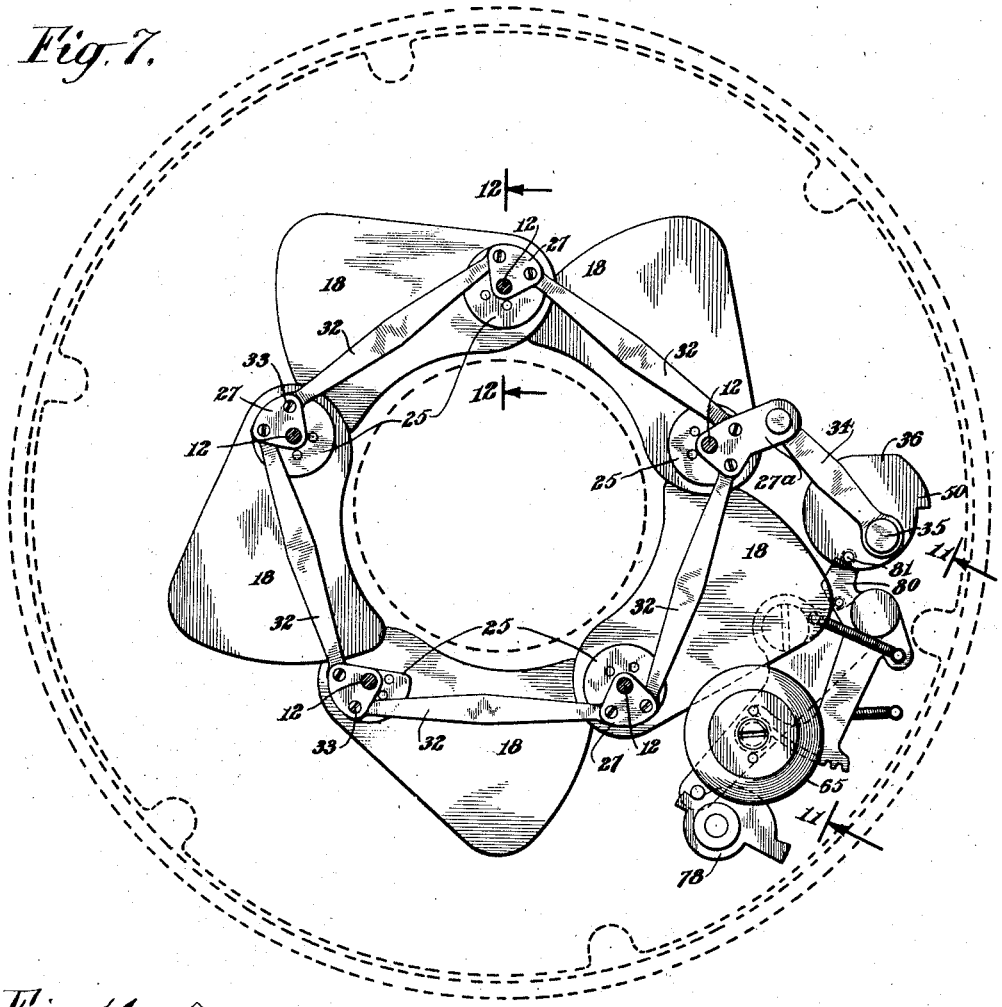
Fig. 7.
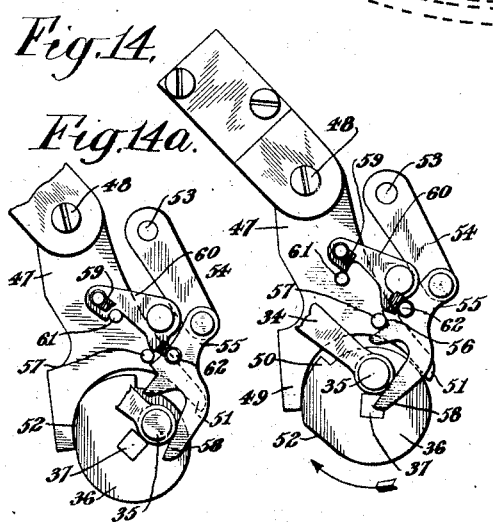
Fig. 14.
Fig. 14a.
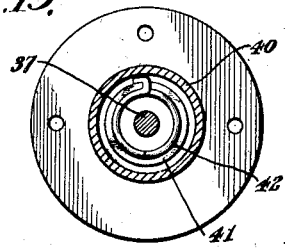
Fig. 15.
INVENTOR
S. M. Fairchild
BY
Cooper, Kerr & Dunham
ATTORNEYS Patented Apr. 26, 1927.

1,626,032

UNITED STATES PATENT OFFICE.

SHERMAN M. FAIRCHILD, OF ONEONTA, NEW YORK.

PHOTOGRAPHIC SHUTTER.

Application filed June 1, 1922. Serial No. 565,075.

This invention relates to photographic shutters of the so-called "between the lens" type, and its chief object is to provide a shutter of simple and durable construction which shall be positive and efficient in operation. Another object is to provide a shutter capable of high exposure speeds for the purpose of photographing rapidly moving objects; for use in a camera which is itself in motion or subject to vibration, as in aerial photography; or for photographing with a large lens-aperture objects which may not be moving rapidly but are strongly illuminated. The latter condition is commonly met with in aerial photography, from an aeroplane or other aircraft. In that work the object to be photographed is usually what is commonly classified as a "distant landscape," requiring, in good light, a smaller lens aperture or higher speed of exposure than would be required for a near object. With a fast lens and a fast and accurate shutter the chief need for reducing the lens aperture is to obtain greater depth of field in taking near objects. In aerial work, however, the object is in nearly every case far enough away to give adequate depth of field without stopping down, and hence if the shutter is sufficiently fast the use of stops can be dispensed with, thereby simplifying the shutter and providing more room for the remaining mechanism. It is to be understood, however, that the present invention is not confined to shutters having no stops or diaphragms. A further object of the invention is to provide a shutter in which the enclosed parts are readily accessible for inspection and repair. To these and other ends the invention consists in the novel features and combinations hereinafter described.

Referring to the accompanying drawings, in which is illustrated the preferred embodiment as designed for aerial work, Fig. 1 is a front view of the interior mechanism of the shutter, the front cover of the casing being removed for the purpose.

Fig. 4 is a rear view, from the right side of Fig. 2, showing the external mechanism for automatic tripping of the shutter at each setting operation.

Fig. 5 is a section on line 5—5 of Fig. 4.

Fig. 6 is a detail rear view of the external mechanism illustrated in Fig. 4 but showing a different operative position.

Fig. 7 is a front sectional view on line 7—7 of Fig. 3 of the blade-actuating mechanism, showing the blades in their outer or open position.

Fig. 14 is a detail view of certain parts of the tripping mechanism, showing their positions shortly after the driving mechanism has been released or tripped.

Figure 1:
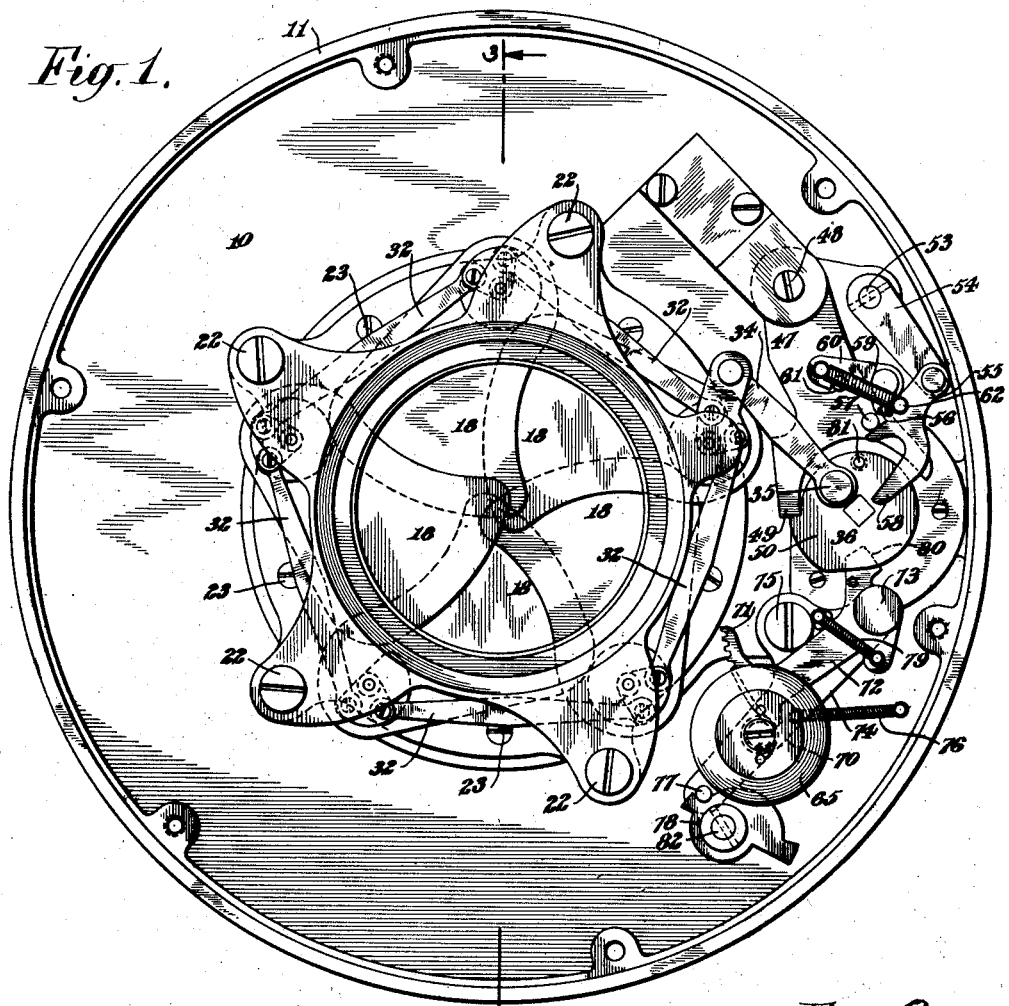

Fig. 14ª is a detail view similar to Fig. 14 but showing the parts in a different position.

Fig. 15 is a section on line 15—15 of Fig. 5.

In the present embodiment of the invention the operative parts of the shutter are all mounted on the rear wall 10 of a casing 11 in the form of a flat cylindrical cup so that when the front wall or cover 12 is removed the interior parts are in no way disturbed. The gusset webs 13, cast integrally with the front and rear walls and with the lens tubes 14, 15, strengthen these walls and permit them to be made thin and light. 16 and 17 represent front and rear lens-cells screwed into the tubes mentioned.

The shutter blades or leaves 18, Figs. 1, 3, 7, 12 and 13, in the present instance five in number, work between the lens cells, and are pivoted in a frame composed of two coaxial rings or annular plates 19, 20, which are connected together and spaced apart by means of studs 21 and screws 22. Removal of the screws permits the front plate to be lifted off. The entire blade assembly is removably mounted on the back wall 10, being held in place (coaxially with the lens tubes) by the screws 23. The blade assembly can therefore be removed and replaced as a unit, but when it is in place the rear plate 20 constitutes in effect a part of the rear wall, thus giving the blade frame, composed of the two plates 19 and 20, sufficient rigidity to permit high blade-velocity without allowing the blade pivots to whip or yield in any direction. The blades themselves, made preferably of thin sheet metal, are roughly sector-shaped, with one side edge concave or incurved as in Fig. 7 to reduce the extent of outward swing required to open the shutter aperture.

Figure 12:
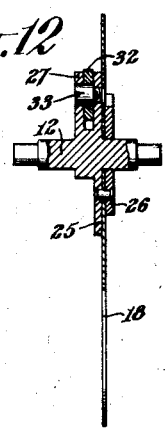
Fig. 12 is a detail section on line 12—12 of Fig. 7, illustrating the blade mounting.

Each blade 18 is mounted on a pivot 12, Fig. 12, between two disks or flanges, 25, 26, to which the blade is fixed by means of rivets. In front of and spaced from the front flange is sector-shaped arm 27. See also Fig. 7. For the sake of strength the pivot and the flange 25 and arm 27 are formed of a single piece of metal, preferably steel. It will be understood that the blade pivots are journaled in the supporting plates or rings 19, 20, Fig. 13. The blades work in the narrow space provided between flanges 28, 29, Fig. 3, extending radially inward from flanges 30, 31 extending axially from the inner edges of the two rings or plates 19, 20.

For the purpose of oscillating the shutter blades they are connected by links 32, Fig. 7, pivoted between the disks 26 and arms 27 on screw-studs 33, and one of the arms, as the one shown at 27ª, in Fig. 7, is formed with an extension connected by a short link 34 to a wristpin 35 on a crank disk 36, which latter is rotated in the direction of the arrow as hereinafter explained. The construction described insures positive operation of the blades without the use of gears, cam-slots, or the like. Any one of the blade-connecting links may be omitted, and the blades will still be actuated by the crank disk 36, but experience has indicated that steadier and more uniform operation is obtained with the full number of links.

The crank disk 36, Fig. 5, is fixed on a shaft 37 extending outwardly through the rear of the casing and having its outer end journaled in a cup 38 provided with a stem 39 rotatable in the outer end of a cylindrical housing 40. Pinned on the shaft at the opposite end is a cup 41; and seated in the cups, with its ends connected thereto, is a barrel spring 42. Outside of the spring-housing 40 the stem 39 is connected to a universal joint 43 for connection with a suitable source of power through the medium of a rigid or flexible shaft, not shown. On the outside end of the spring housing is a one-toothed ratchet 44, Fig. 6, engaged by a pawl in the form of a spring actuated plunger 45 working in a bracket 46, Fig. 2, fixed on the side of the housing; and on the inside of the shutter casing is a yoke 47, Fig. 1, pivoted at 48 and having an arm 49 adapted to engage a tooth 50 on the crank disk 36. It will therefore be seen that the driving spring 42, Fig. 5, can be tensioned by rotation of the cup 38 in the direction of the arrow around the universal joint 43. Then if the yoke 47, Fig. 1, be swung leftwardly out of engagement with the tooth 50 on the crank disk 36 the latter will be rotated by the spring, thereby actuating the driving link 34. Preferably the parts are so proportioned that one complete revolution of the crank disk from the initial position of Fig. 1 will swing the blades to their extreme outward position shown in Fig. 7 and back again to the closed position shown in Fig. 1.

From the preceding paragraph it will be seen that in tensioning the driving spring 42 its outer end is turned in the direction of the arrow on the universal joint 43, and that in actuating the blades the inner end of the spring turns in the same direction. Hence as the spring is tensioned and released in successive exposures it is rotated, step by step, in a constant direction.

The position of the crank disk 36 shortly after release is shown in Fig. 14, in which it will be seen that for a certain period after release the yoke 47 can have no motion on its pivot; but when the tooth 50 reaches the other arm, 51, it swings the yoke toward the right, thereby bringing the arm 49 back into position to engage tooth 50 when the latter reaches its initial position, this swing of the yoke being permitted by the slope 52 of the tooth at its rear end. It will therefore be seen that the controlling member or yoke is positively, and at the same time automatically, positioned for re-engagement of the driving mechanism without the use of a spring for the purpose.

Figure 2:
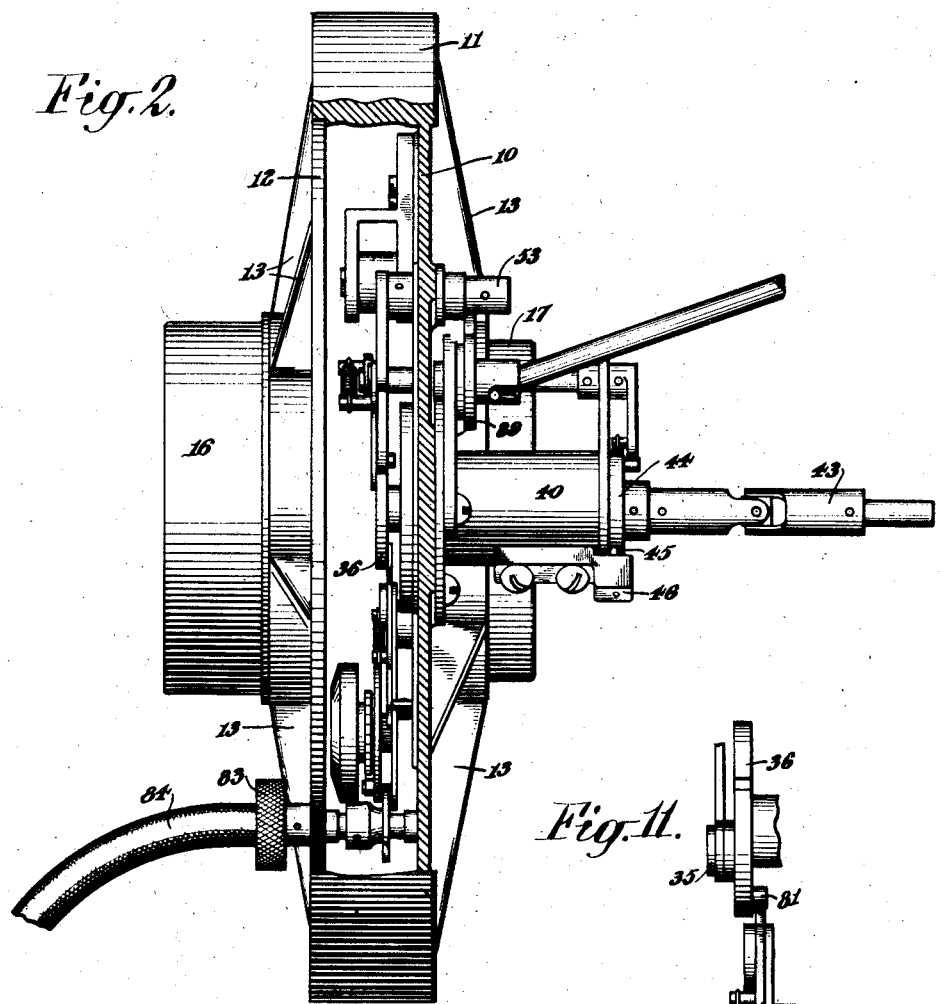
Fig. 2 is a side view from the right of Fig. 1, with the front cover in place but with the side of the casing broken away to show the enclosed parts.

The controlling yoke 47, Fig. 1, is actuated from outside of the casing to release the driving mechanism by means of a short shaft 53, mounted in the rear wall of the casing and carrying on its inner end an arm 54 to the free end of which a dog 55 is pivoted, having a shoulder 56 to engage a stud 57 on the yoke, and a tail 58 in the path of the wristpin 35. A spring 59 holds the arm 54 and dog 55 normally in the position shown in Fig. 1, with the shoulder 56 slightly retracted from the stud 57. The spring is connected to a pawl 60, having a hooked end engaging a stud 61 on the yoke 47 and a toe engaging the stud 62 on the dog 55. See also Fig. 14. It will therefore be noted that yoke 47 is locked in engagement with the driving disk 36 by the pawl 60, so that the shutter cannot be discharged by ordinary jars or shocks. When, however, the release shaft 53 is rotated clockwise and the dog 55 is advanced, the first effect of the latter movement is to swing the pawl 60 up (by means of stud 62 cooperating with the toe of the pawl), thereby disengaging the pawl from the stud 61. The release yoke is now free, whereupon further advance of the dog brings the shoulder 56 against stud 57 and swings the yoke to the left, which carries the arm 49 out of engagement with the stop tooth 50. As the wristpin 35 moves toward the right (Fig. 14) it engages the tail 58 and swings the dog to the right, thus tensioning spring 59, so that when the yoke is swung rightwardly by the tooth 50 engaging arm 51 the pawl is depressed into re-engagement with stud 61. The rightward actuation of dog 55 by the wristpin 35 carries the shoulder 56 out of the path of the stud 57; with the result that when the yoke 47 is swung toward the right by the tooth 51 as described, the stud 57 takes a position above the shoulder 56 as indicated in Fig. 14ª. At the same time, spring 59 tends to swing the dog 55 clockwise, but the latter is held by the wristpin 35, and hence the effect of the spring is to swing the arm 54 counterclockwise and simply draw the dog upwardly and rightwardly until its tail 58 is clear of the downwardly and leftwardly moving wristpin. At this instant the shoulder 56 is at the right of (and below) the stud 57, whereupon the dog swings up and brings the shoulder again behind the stud; unless (as hereinafter described) the arm 54 is held against the counterclockwise movement mentioned, in which case the dog remains in the position shown in Fig. 4 and the shutter cannot be released again.

When the shaft 39, Fig. 5, is rotated in the direction of the arrow the inner end of the spring 42 is held by means of cup 41, shaft 37, tooth 50 (Fig. 1) and arm 49 on yoke 47, and when the spring has been tensioned its outer end is held by means of cup 38, disk 44, and plunger 45. When the disk 36, Fig. 1, is released, the cup 41 and the inner end of the spring 42 revolve in the direction of the arrow, Fig. 5, until arrested by the reengagement of tooth 50 with the arm 49. It will therefore be seen that in each complete cycle of operation of the shutter, from the beginning of the tensioning of the spring to the end of the closing movement of the blades, the outer end of the spring makes a rotational step in advance of the inner end, and then the inner end makes a rotational step in the same direction. In succeeding cycles the same operations reoccur. In other words, in successive operations of the shutter the spring revolves step by step, in a constant direction.

Figure 8:
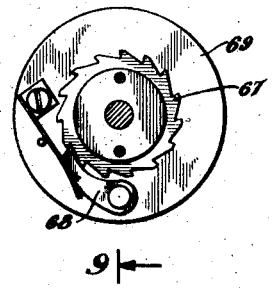
Fig. 8 illustrates a part of the retarding mechanism, in section on line 8—8 of Fig. 9.
Figure 9:
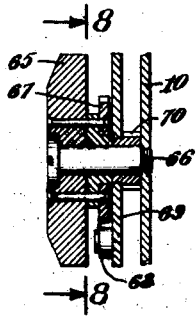
Fig. 9 is a sectional view on line 9—9 of Fig. 8.
Figure 11:
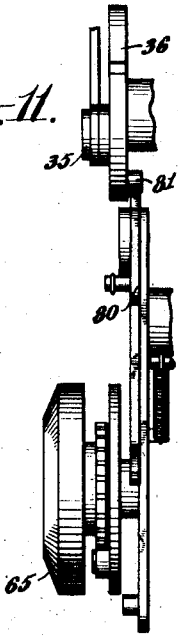
Fig. 11 is a detail side view of the retarding mechanism on a larger scale than Fig. 2, the view being taken in the direction of the arrows 11—11 in Fig. 7.
Figure 10:
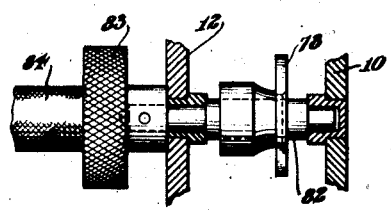
Fig. 10 is a detail side view of the timing cam and its adjusting connection.
Figure 3:
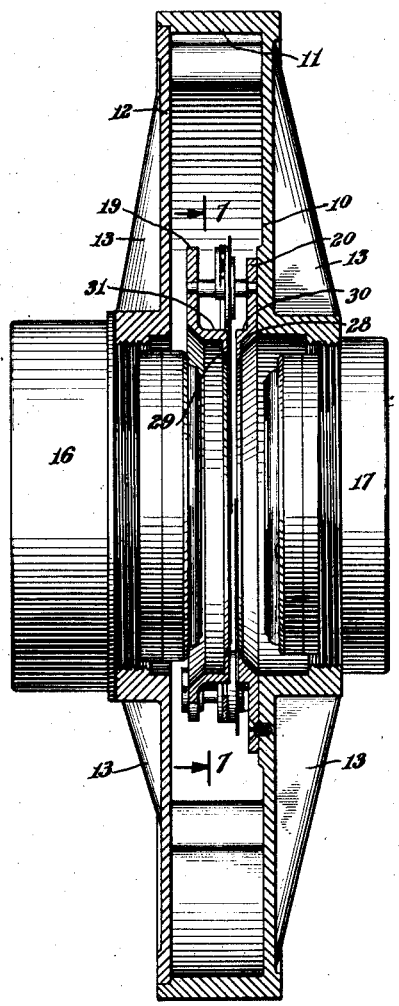
Fig. 3 is a section on line 3—3 of Fig. 1.
Figure 13:
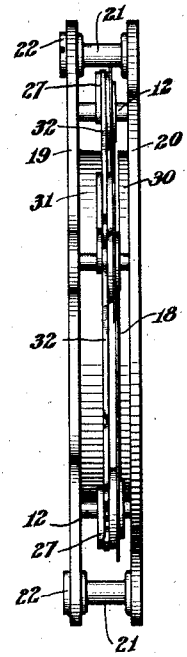
Fig. 13 is a side view of the blade assembly from the right of Fig. 3.

So far as described, the shutter always operates at the same exposure speed except as altered by variation in the tension of the driving spring by varying the number of turns of the shaft 39 between exposures. I prefer, however, to provide special speed-varying means for use instead of or in conjunction with variation of spring-tension, and preferably such means takes the form of mechanism for slowing up or retarding the blades just as or after they reach full-open position. In the present embodiment this retard is produced by causing the crank disk 36, Figs. 1 and 7, to drive a heavy inertia-device during the appropriate part of the disk's revolution. This inertia device is a heavy weight flywheel 65 (see also Figs. 9 and 11) rotatably mounted on a stud 66 fixed in the rear wall 10 of the shutter casing. The retarding wheel has concentric with it a ratchet 67 (see also Fig. 8) engaged by a pawl 68 mounted on a disk 69 fixed on the hub of a pinion 70 rotatably mounted on the stud 66. The pinion meshes with a sector or curved rack 71, Fig. 1, carried by an arm 72 pivoted at 73 on a carrier 74 which is itself pivoted at 75 on the rear wall 10 of the shutter casing. A spring 76 urges the carrier counterclockwise and holds the stud 77 on its lower end firmly against the cam 78; and a spring 79 holds the arm 72 yieldingly in the position shown, with the finger 80 in the path of a stud 81 on the rear face of the driving disk 36. Now as the revolving disk approaches or reaches the position at which the blades have fully opened the exposure-aperture the stud meets the leftwardly inclined edge of the finger and tends to ride up on the latter, which, if the finger were fixed, would result in arresting the disk. The finger is movable however; but in moving, it has to rotate the relatively heavy disk 65 through the medium of the rack 71 and pinion 70. Hence when the stud encounters the finger the resistance caused by the inertia of the parts slows up the driving disk 36 and retards it until the stud has cammed the finger down far enough to pass it, whereupon the driving disk resumes full speed. At the same time the spring 79 restores the arm 72 and rack 71 to initial position, the pawl 68, Fig. 8, riding backward over the ratchet 67. Evidently the duration of the retarding effect depends upon the speed imparted to the inertia-disk and upon the length of time during which the retarding stud 81 is in engagement with the finger 80. These factors in turn depend upon the extent or length of the finger-edge is in the path of the stud, and this can be varied at will by means of the timing cam 78, Fig. 1. Thus, as the cam is turned counterclockwise from the position shown (which gives the maximum retard and hence the slowest shutter-speed with a given driving spring tension) the carrier 74 is rocked clockwise on its pivot 75, thereby moving the finger 80 downwardly and leaving less of it in the path of the stud 81. When the cam is in its extreme counterclockwise position the finger is entirely out of the path of the stud and the driving disk suffers no retardation. This gives the maximum shutter-speed with the given spring-tension. The timing cam is fixed on a shaft 82, Fig. 10, journaled in the front and rear walls 12 and 10 of the shutter casing and extending through the former into connection with an adjusting button 83. The latter may be connected with a flexible shaft 84 for actuation from a point remote from the shutter. A scale on the shutter front 12 and a pointer (not shown) on the hub of button 83 may be provided to indicate various positions of the timing cam and the resulting speed-variations.

It is desirable to have the retardation of the blades begin after or shortly before the exposure-aperture is completely open, and end before or shortly after they begin to close the opening. The blades then open and close with maximum velocity and remain open for the maximum time in a given duration of exposure, thus giving high efficiency. Accordingly the stud 81, Fig. 1, is so located on the driving disk 36 that it will not meet the retarding finger 80 until the wristpin 35 has moved far enough (about 180°, more or less) from the position shown in the figure to very nearly, if not entirely, open the blades; and the finger is so designed and located that even at the slow-speed position of the timing cam 78, Fig. 7, the stud will escape the finger about the time the blades begin to cover the aperture.

The blades cannot start from rest, either in their opening or closing movement, at their maximum velocity, since a certain amount of time is required for the driving spring to overcome the inertia of the driven parts. I therefore make the blades wide enough to give them, when in closed position, Fig. 1, an overlap in excess of the amount needed to exclude light. Hence after they begin to swing outwardly a certain time must elapse before they "break" and let the exposure begin, and in this period they pick up speed so that when the "break" occurs they are moving at high velocity. For a similar purpose the curvature of their inner edges, the throw of the crank disk 36, Fig. 7, the length of the arm 27ª, etc., are so correlated that the blades have an outward movement in excess of that needed to completely open the exposure aperture. Hence when the blades start to swing back, a certain period must elapse before they reach the aperture, and in this period they pick up speed so that they are moving with high velocity when the closing of the aperture actually begins.

In order to insure having the driving spring under tension when the shutter is "tripped" or released for an exposure, provision is made whereby a second release cannot occur until the spring is tensioned, in the present instance by adequate rotation of the shaft 39, Fig. 5. For this purpose the tripping-shaft 53, Figs. 1, 4, 5 and 6, is extended through the rear wall 10 of the shutter casing, and is equipped on its outer end with a dog 86, having arms 87 and 88, the former cooperating with a cam 89 (as in Fig. 4) journaled in the casing and provided with a coupling 90 for connection with a shaft (not shown) by which the cam can be rotated by suitable driving mechanism (not shown) remote from the shutter and under the control of the operator. When the cam is rotated in the direction of the arrow (Fig. 4) the dog is rocked counterclockwise, thereby rocking the shaft 53 and arm 54, which in turn actuate the yoke 47 and thereby release the driving disk 36, Fig. 1, as previously explained. At the same time, arm 88 of the dog 86 is swung up into a recess in the end of a finger 91 fixed on a shaft 92 to which is also fixed an arm 93 extending into the path of a stud 94 on the ratchet 44. It will therefore be seen that when the arm 88 has engaged the notch in finger 91, as shown in Fig. 6, the dog cannot swing back to initial position, and hence the trip-arm 54 is held in the position shown in Fig. 14ª. When, however, the shaft 39, Fig. 6, is rotated in the direction of the arrow on the ratchet 44 the stud 94 swings the arm 93 clockwise, thereby rocking finger 91 in the same direction and releasing arm 88 of dog 86. Trip-arm 54, Fig. 14ª, can now swing counter-clockwise, which allows spring 59, Fig. 14, to raise the dog 55 and bring shoulder 56 behind stud 57. At the same time the arm 87 of dog 86, Fig. 6, is swung into engagement with the trip-cam 89, so that the next rotation of the latter will trip or release the shutter as already explained. It will be observed that the stud 94 is so located that arm 93 is not actuated to release the dog 86 until the shaft 39 has neared the end of its tensioning movement, which, in the present construction, is one full revolution. The rock-shaft 92, carrying the arms 91 and 93, Fig. 5, is mounted in brackets 95 and 96 fixed on the wall 10 and spring-housing 40, and the shaft is urged counterlockwise, by a spring 97 connected with the arm 93, to hold finger 91, Fig. 4, in position for engagement by the arm 88 as the latter is swung out by the cam 89.

It is to be understood that the invention is not limited to the construction herein specifically illustrated and described but can be embodied in other forms without departure from its spirit.

I claim—

1. In a photographic shutter, the combination with a casing having an exposure opening or aperture, of a pair of blades each pivoted to oscillate out of and into the path of light rays through said aperture at each exposure, means connecting the blades to actuate one from the other and cause them to oscillate simultaneously, and a rotary driving member having crank connection with said blades, the radius of the crank connection being adapted to require a complete revolution thereof to effect opening and closing movement of the blades.

2. In a photographic shutter, in combination, a casing having an exposure aperture, a plurality of exposure blades pivoted around said aperture, links connecting the blades to cause the same to oscillate simultaneously, the blades and links being the same in number whereby each blade is linked to each adjoining blade, a rotary driving member of the crank type having a radius adapted to require a complete revolution for each exposure operation of the shutter, and a link connecting the driving member with one of said blades to actuate the blades.

3. In a photographic shutter, in combination, a shutter blade, a pivotal support for the blade, a pair of axially spaced members extending radially from the pivotal blade-support, a link pivoted between said members, and supporting means for both ends of said pivotal blade-support.

4. In a photographic shuter, in combination, a pair of shutter blades; pivotal supports therefor, each of said supports having a pair of axially spaced radially extending members; and a link pivoted at its ends between the respective members.

5. In a photographic shutter, in combination, a pair of shutter blades; pivotal supports therefor, each of said supports having a pair of axially spaced radially extending members; a link pivoted at its ends between the respective members, and means for supporting both ends of each pivotal blade support.

6. In a photographic shutter, in combination, a pivotal blade-support, a disk fixed on the support between its ends, a blade mounted on the support and fixed to the disk, an arm extending radially from the support and spaced axially from the disk, and a link between the arm and disk and pivoted thereto.

7. In a photographic shutter, in combination, a casing having a wall provided with an exposure aperture, a pivotal blade-support having one end supported adjacent to said aperture, a member housed within said casing and spaced axially from said wall of the casing and supporting the other end of the blade-support, a blade mounted on the blade-support and arranged between said member and said wall, and means for actuating the blade to move the same out of and into the path of rays through said aperture.

8. In a photographic shutter, in combination, a plurality of blades movable outwardly and inwardly to open and close an exposure aperture and overlapping each other in their inner positions to an extent exceeding that needed to prevent the admission of light, and means for moving the blades outwardly with increasing velocity, said means including a rotatable crank-disk and a link connected with the disk to transmit motion therefrom to the blades.

9. In a photographic shutter, in combination, a plurality of blades movable outwardly and inwardly to open and close an exposure opening, and blade-actuating means by which the blades are moved outwardly with increasing velocity and inwardly with increasing velocity; the blades overlapping in their inner positions to an extent in excess of that required to prevent the admission of light and having outer positions beyond the boundary to the exposure aperture, whereby the aperture-opening and aperture-closing movements of the blades are accomplished with relatively high velocity.

10. In a photographic shutter, in combination, a plurality of blades movable outwardly and inwardly to open and close an exposure opening, and blade-actuating means by which the blades are moved outwardly with increasing velocity and inwardly with increasing velocity, said means including a rotatable crank disk and a link connected with the disk to transmit motion therefrom to the blades; the blades overlapping in their inner positions to an extent in excess of that required to prevent the admission of light and having outer positions beyond the boundary to the exposure aperture, whereby the aperture-opening and aperture-closing movements of the blades are accomplished with relatively high velocity.

11. In a photographic shutter, in combination, a plurality of blades movable outwardly and inwardly to open and close an exposure aperture, and means by which the blades are moved inwardly from their outer position with increasing velocity, said means including a rotatable crank disk and a link connected with the disk to transmit motion therefrom to the blades; and means operable only after the blades have substantially uncovered the exposure aperture, to retard the blades and thereby lengthen the period during which the aperture is fully open.

12. In a photographic shutter, in combination, a plurality of blades movable outwardly and inwardly to open and close an exposure opening; means for actuating the blades, said means including a rotatable disk and a link connected with the disk to transmit motion therefrom to the blades; and means cooperating with the disk to retard the latter only after the same has moved the blades to approximately the position at which the aperture is fully open.

13. In a photographic shutter, in combination, a plurality of blades movable outwardly and inwardly to open and close an exposure aperture; a rotatable crank disk and a link connected with the disk to transmit motion therefrom to the blades to actuate the same; and blade-retarding means comprising an inertia device arranged to cooperate with the crank disk at an appropriate time and retard the blades by retarding the disk.

14. In a photographic shutter, in combination, a plurality of blades movable outwardly and inwardly to open and close an exposure aperture; means for moving the blades outwardly and inwardly with increasing velocity, and with relatively low velocity during the period in which the exposure aperture is substantially fully open; and means operable at will to further reduce the velocity of the blades in the said open period.

15. In a photographic shutter, in combination, a lever having a rack, an inertia device having a pinion meshing with said rack for rotation thereby, a movable blade-actuating member having a part adapted to engage an arm of the lever to rock the same and thereafter pass out of engagement with said arm, whereby said rack is actuated during the period of engagement, and releasable means for normally holding the blade-actuating member against movement.

16. In a photographic shutter, in combination, a movable blade-actuating member having a stud, a lever having an arm adapted to be engaged by said stud for actuation thereby while the stud is traversing a predetermined portion of its path, an inertia device associated with the other arm of the stud for actuation thereby, means for shifting said lever relatively to said stud to vary the length of said predetermined portion of said path, and releasable means normally holding the blade-actuating member against movement.

17. In a photographic shutter, in combination, a rotatable blade-actuating disk having a shoulder and a stud, a lever adapted for actuation by the stud, an inertia device actuated by the lever, and a manually releasable detent normally cooperating with said shoulder to prevent movement of the blade-actuating member.

18. In a photographic shutter, in combination, a rotatable blade-actuating disk, a shiftable detent having a pair of arms embracing the disk and one of said arms adapted to engage said disk to prevent rotation of the same, and means for shifting the detent to disengage said arm from the disk and simultaneously bring the other arm into position for engagement by the disk to shift the detent back into position for re-engagement of the first arm with the disk.

19. In a photographic shutter, in combination, a rotatable blade-acting disk having a tooth; a pivoted detent having arms embracing the disk, one normally engaging the tooth to prevent rotation of the disk and the other normally spaced from the disk, and means for swinging the detent to carry the first arm out of engagement with the tooth and carry the second arm into position for engagement by the tooth whereby the first arm is moved back into position to re-engage the tooth.

20. In a photographic shutter, in combination, a rotatable blade-actuating member rotatable in one direction only, a barrel-spring connected at one end with the said member to actuate the same, and a rotatable tensioning member connected with the other end of the barrel-spring to tension the same and rotatable only in the same direction as the blade-actuating member.

21. In a photographic shutter, in combination, a casing, a rotatable blade-actuating member mounted inside of the casing and rotatable in one direction only, a coil spring outside of the casing and having one end connected with the said member to rotate the same, and a rotatable tensioning member connected to the other end of the spring and rotatable only in the same direction as the blade-actuating member.

22. In a photographic shutter, in combination, a movable blade-actuating member, a spring connected therewith to actuate the same, a tensioning member connected with the spring to tension the same, releasable means engaging the blade-actuating member to normally prevent movement thereof, and interlocking mechanism associated with the tensioning member and said means to prevent release of the blade-actuating member until the tensioning member has been actuated.

23. In a photographic shutter, in combination, blade-actuating mechanism, a spring to actuate said mechanism, releasable means associated with said mechanism to normally prevent operation thereof, and interlocking mechanism cooperatively associated with the spring and said releasable means to prevent release of the latter until the spring has been tensioned.

24. In a photographic shutter, in combination, a blade-actuating member, a detent shiftable into and out of engagement with said member to lock and unlock the same, a spring connected with said member to actuate the same, a rotatable tensioning member connected with the spring, locking means automatically cooperating with the detent to lock the same and thereby prevent unlocking of the blade-actuating member, and mechanism actuated by the tensioning member and associated with said locking means to unlock the detent and thereby permit shifting of the same and consequent unlocking of the blade-actuating member.

25. In a photographic shuter, in combination, a movable blade-actuating member, a detent shiftable into and out of engagement with said member to lock and unlock the same, a pivoted dog connected with the detent to shift the same out of engagement with said blade-actuating member, a rotatable device associated with the dog to actuate the same, a spring connected with the blade-actuating member to actuate the same, a tensioning member associated with the spring to tension the same, and means acting automatically to lock the dog in inoperative position but connected with the tensioning member for actuation thereby to release the dog when the tensioning member is itself actuated to tension the spring.

In testimony whereof I hereto affix my signature.

SHERMAN M. FAIRCHILD.